(No Model.) 2 Sheets—Sheet 1.

O. H. PIEPER.

ELECTRICAL APPARATUS FOR OPERATING DENTAL INSTRUMENTS.

No. 510,048. Patented Dec. 5, 1893.

Witnesses:
E A Brandau
Wilson D. Bent Jr.

Inventor:
Oscar H. Pieper
By John Richards Atty

THE NATIONAL LITHOGRAPHING COMPANY, WASHINGTON, D. C.

(No Model.) 2 Sheets—Sheet 2.

O. H. PIEPER.

ELECTRICAL APPARATUS FOR OPERATING DENTAL INSTRUMENTS.

No. 510,048. Patented Dec. 5, 1893.

Witnesses:

E A Brandau

Wilson D Bent, jr

Inventor:

Oscar H. Pieper

By John Richards

Atty

THE NATIONAL LITHOGRAPHING COMPANY, WASHINGTON, D. C.

United States Patent Office.

OSCAR H. PIEPER, OF SAN JOSÉ, CALIFORNIA.

ELECTRICAL APPARATUS FOR OPERATING DENTAL IMPLEMENTS.

SPECIFICATION forming part of Letters Patent No. 510,048, dated December 5, 1893.

Application filed November 25, 1892. Serial No. 453,088. (No model.)

*To all whom it may concern:*

Be it known that I, OSCAR H. PIEPER, a citizen of the United States, residing in San José, county of Santa Clara, and State of California, have invented certain new and useful Improvements in Electrical Apparatus for Operating Dental Implements; and I hereby declare the following specification, with the drawings therewith, forming a part of the same, to be a full, clear, and exact description of my invention.

My invention relates to apparatus whereby rotative motion is imparted to dental implements by means of an electrical current, and consists of an electric motor suspended in a ring and gimbal bracket, to be attached to a wall or other suitable support, the operating parts being mounted in the ring, the sides of the latter being covered or inclosed by hemispherical covers, so the whole is contained in a globular or spherical case having a movement on two axes for adjustment, horizontally and vertically.

My invention also consists in a method of engaging or connecting the electric motor, or its armature, with a spindle for operating dental implements, by means of a friction clutch operated by a magnet, so the armature and spindle are engaged when the current is passing through the motor, and instantly disengaged when the current is cut off.

My invention further includes various constructive features that will be more fully pointed out in connection with the drawings, in which—

Figure 1:
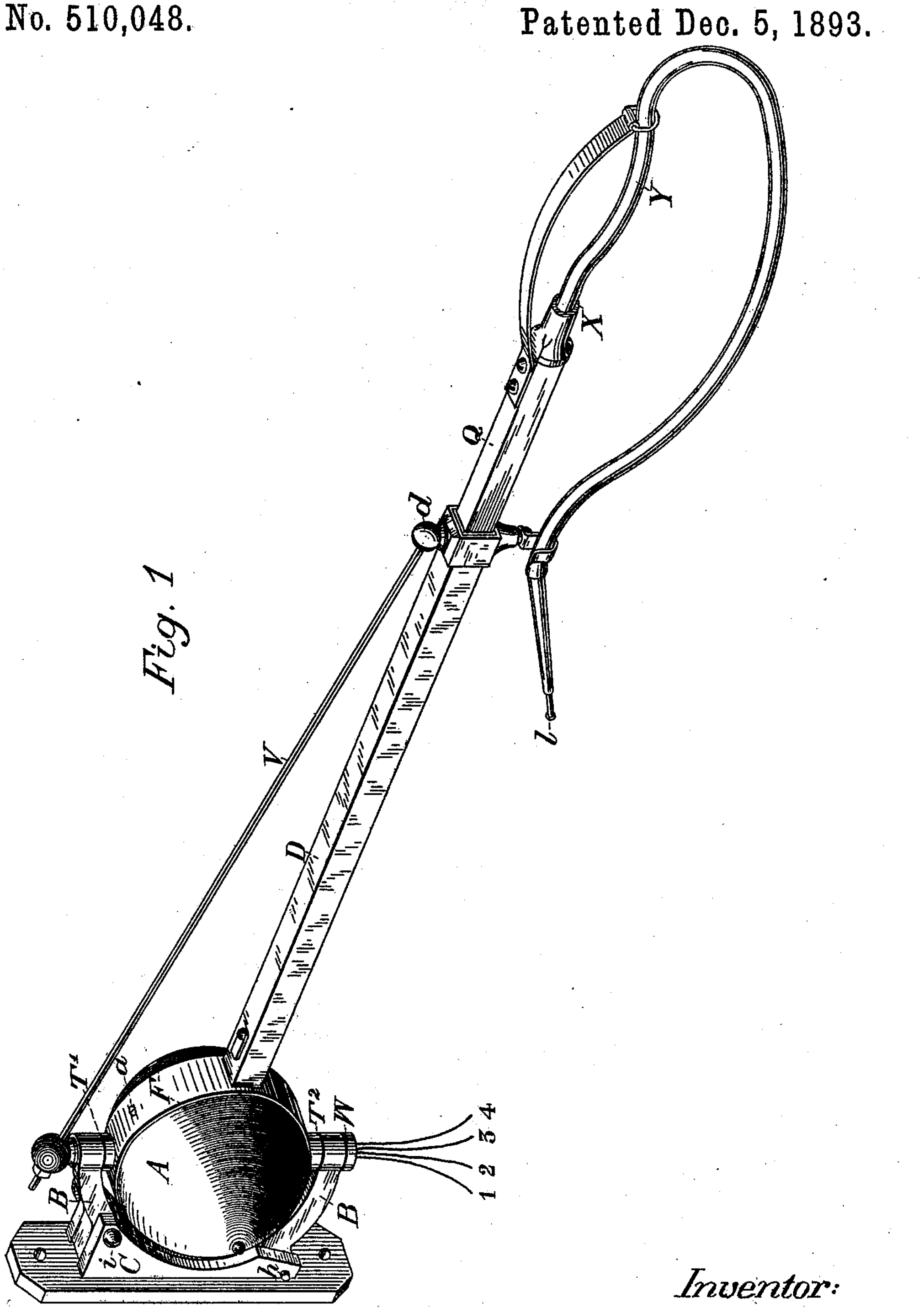
Figures 2, 3, 4:
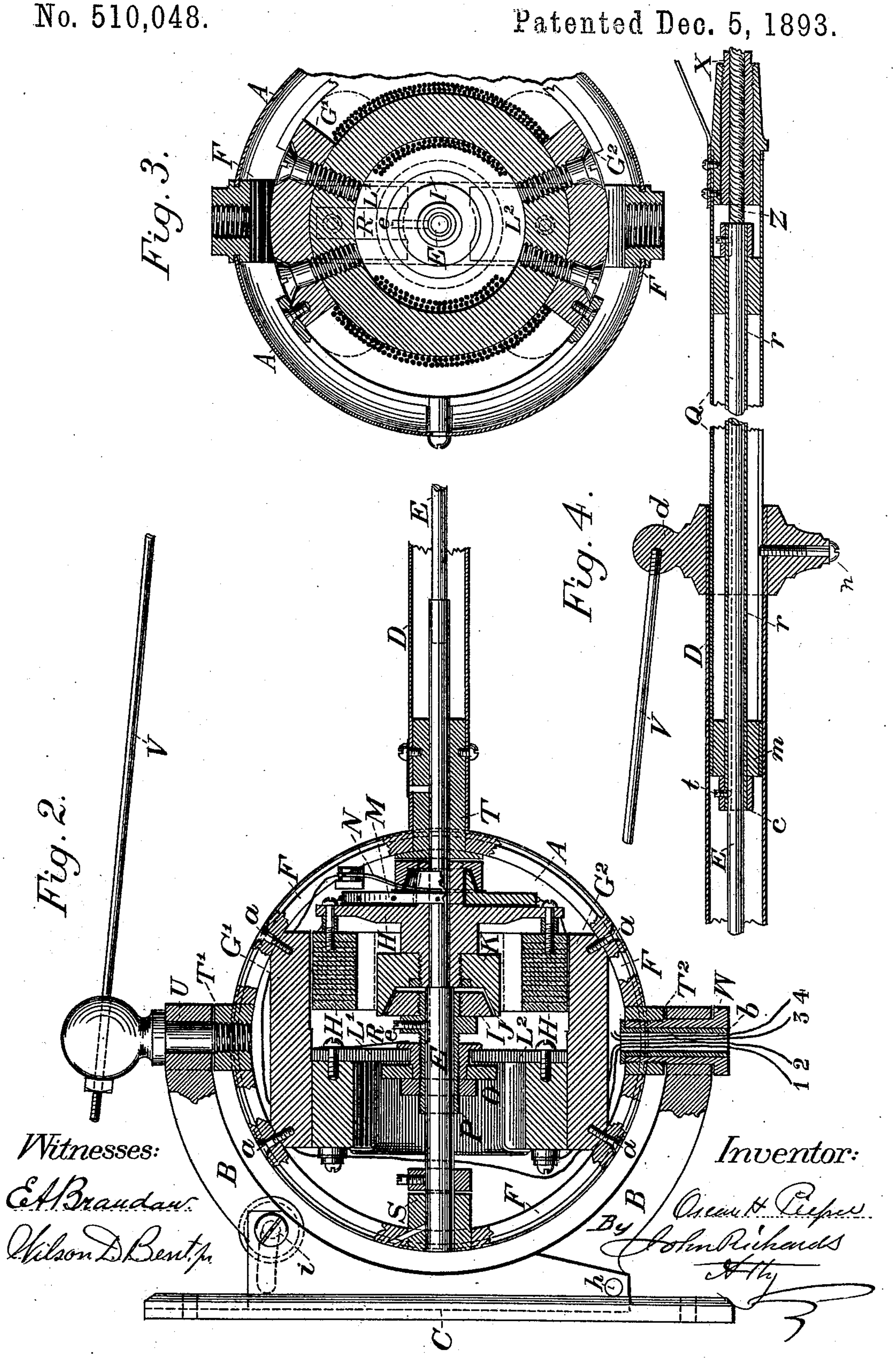

Figure 1 is a perspective elevation of my apparatus for operating dental implements. Fig. 2 is a vertical central section on the line of the motor's axis. Fig. 3 is a partial, transverse section, showing the pole pieces of the motor, and the magnets employed to operate the friction clutch, and by this means stop or start the operating spindle. Fig. 4 is a section showing the construction of the transmitting spindle operated by the motor, and the manner of supporting the spindle.

Similar letters and numerals of reference are employed to indicate corresponding parts in the different figures of the drawings.

Referring first to Fig. 1, A is a spherical case containing the electrical apparatus and other details to be hereinafter described. B is a curved segment to which the case A is pivoted, and C a bracket in which segment B is mounted, so constructed as to be fastened to a wall or other suitable support. D is a tubular stem projecting from the case A, and supporting the revolving spindle E, the latter provided with bearings and adjustments, as shown in Figs. 2 and 3, and hereinafter described.

Referring to Figs. 1 and 2, and especially to the electrical elements of my apparatus, F is a gimbal ring pivoted in its vertical axis, and to which are attached the various operating parts as shown.

$G'$ $G^2$ are pole pieces attached to the ring F by the screws *a*.

H is the armature revolving loosely on a shaft or spindle E.

M is the commutator having its face radial to the axis of revolution, and N is one of the brushes bearing thereon.

I is the internal or movable part of a friction clutch, held on a sleeve P, sliding on the enlarged portion of the spindle E, and held from turning thereon by means of a screw or pin *e*, the point of which slides in a groove in the shaft E, as indicated by dotted lines. The matrix or exterior part of the clutch K is attached to the armature H, which revolves loosely on the spindle E.

$L'$ $L^2$ are magnets attached to the field magnets of the motor employed to engage and disengage the friction clutch, and stop or start the spindle E in the following manner: When the electric current is passing through wires 1 and 2, or 3 and 4, the iron disk O, fastened to the sleeve P, is attracted by the magnets $L'$ $L^2$, and the sleeve P is moved forward engaging the friction clutch I, and thus connecting the spindle E with the armature H, setting the spindle E in motion. When the current is cut off, the plate I is released from the magnets $L'$ $L^2$, and the clutch is disengaged by the action of the spring R, which presses back the sleeve P with all parts mounted thereon, disengaging the friction faces at J so the spindle E, having but little weight and momentum, will stop instantly. This instantaneous disconnection of the spindle E from the armature H is necessary, because the momentum of the latter causes it to revolve some time after the electric current is cut off, while the shaft or spindle E, with the implements operated thereby, should stop instantly. When the current is again connected, the disk O, attracted by the magnets L′ $L^2$, instantly moves the sleeve P, engaging the clutch I, and starting the spindle E, as before explained.

The armature is started, stopped and reversed in the usual manner by means of a rheostat and double pole switch combined, to which the wires from the battery or other source are led, thence connected with wires 1, 2, 3 and 4, shown in Fig. 2. This rheostat not forming an essential part of the apparatus described in my present specification, I reserve its description at this time, with a view to filing a separate application for Letters Patent thereon.

In the mechanical construction and operation of my improved apparatus, I employ, as before explained, a ring F, made of strong section, as shown in Fig. 3, to which are attached all the operating parts of the electrical apparatus, including the main bearings S and T of the spindle E. This ring F is supported in a gimbal segment B by pivotal bearings T′ $T^2$, as shown in Fig. 2. This segment B is in turn supported in the stationary bracket C, adapted for fastening to a wall or other suitable support. The segment B is pivoted on a pin at *h*, and held at the top by a clamp screw *i*, passing through a curve slot *o* in the segment B, as shown by dotted lines in Fig. 2. By loosening this screw *i* the segment B can be moved out or in, thus depressing or raising the tubular extension D as the convenience of operating may demand. The pivotal upper bearing T′ of the ring F is formed by the screw U, which also serves as a support for the truss rod V. At the bottom bearing $T^2$ the screw W is made hollow, and insulated by a lining *b*, of non-conducting material through the bore of which pass the conducting wires 1, 2, 3 and 4, representing the armature and field magnet wires, the double set being required to reverse the motion of the armature H. Projecting from the front of the ring F, and formed integrally therewith, is the bearing T forming a nipple to receive the tubular stem D and Q, terminating in a socket X, to which is attached a flexible extension Y, shown in Fig. 1, and through which is continued a flexible driving connection Z, attached to and operating drills and other working implements at *l*, as shown in Fig. 1. The tubular stem D is composed of two sections, the outer portion Q sliding within the main section D so the length may be changed to suit the convenience of use. The shaft or spindle E has also a telescope joint at *c*, the spindle E sliding within the hollow stem *r*, representing a continuation of the spindles D, and to the end of which is attached the flexible driving connection Z. The hollow stem *r* is driven by a pointed screw *t*, sliding in a groove in the spindle E, as indicated by dotted lines in the drawings.

To support the tubular stem D I employ a truss rod V, attached to the head of the screw U, and to a collar *d* on the tubular stem D, as shown in Fig. 4. In the bottom of this collar *d* I insert a screw *n*, projecting into a shallow groove in the bottom of the tube Q, stopping at the bearing *m*, thus guarding against the part Q being drawn out too far when extended.

The flexible connection Z, and other operating details, being of the usual kind, do not require description.

I am aware that electric motors have been employed to operate dental implements, being mounted both fixed and adjustably, and do not claim broadly such application, but What I do claim, and desire to secure by Letters Patent, is—

1. In an electrical apparatus as herein described, for operating dental implements, an electric motor pivotally supported in a ring or frame, its armature mounted loosely on a continuous rotary spindle having its main bearings in the same ring, the two connected by a friction clutch whose action depends upon the electric current passing through the field magnets of the motor magnets; L′ and $L^2$ engaging and releasing the clutch, in the manner substantially as and for the purposes specified and explained.

2. In an electric apparatus as herein described, a supporting ring or frame to which the parts of the motor are attached, pivotally supported in its vertical axis, and adjustable in the same plane, provided with bearings for a rotary spindle; a friction clutch for connecting the electric motor and the rotary spindle, the latter engaged and disengaged by magnets, the action of which depends on the actuating electric current, in the manner substantially as and for the purposes set forth.

3. In an electric apparatus as herein described, to operate dental implements, a supporting ring within which the pole pieces and field magnets are attached, a continuous rotary spindle passing across, and having its main bearings attached to the supporting ring, an armature mounted loosely on the spindle and provided with a friction clutch, so the armature and spindle can be connected and revolve together, or the spindle be disengaged and stopped independent of the armature, in the manner substantially as and for the purposes specified.

4. In an electrical apparatus, as herein described, to operate dental implements, an electric motor and revolving spindle, mounted and held within a pivotally supported ring, a segmental frame or bracket for supporting the ring, adjustably attached to a fixed bracket, so the axis of the spindle can be changed in a vertical plane, and thus vary the height of the outer end of the spindle and its attachments, as the convenience of use may demand, in the manner substantially as and for the purposes specified.

5. In an electrical apparatus as herein described, for operating dental implements, a pivotally supported ring or frame having an electric motor mounted therein; a rotary spindle journaled in the horizontal axis of the ring, and the armature of the motor mounted loosely thereon; a friction clutch to connect and disconnect the armature with the spindle; magnets L′ $L^2$ to close the clutch, and a spring R to open or disengage the clutch when the electric current is cut off, in the manner substantially as and for the purposes set forth.

6. In an electrical apparatus, as herein described, for operating dental implements, an electric motor mounted in a pivotally-supported ring or circular frame, held in a gimbal segment B, and inclosed at the sides by removable covering plates attached to the sides of the ring, so the whole is inclosed and protected from dust or accident in use, in the manner substantially as and for the purposes specified.

7. In an electrical apparatus, as herein described, for operating dental implements, a pivotally-mounted ring or frame, with an electric motor supported therein, the armature of which is loosely mounted on a continuous rotary spindle passing through the horizontal axis of the ring or frame, and extending outward into a tubular extension as shown; a sleeve P sliding thereon, provided with the friction disk I and iron ring O, so the armature and shaft can be connected and disconnected by an electric current without disturbing the armature, in the manner substantially as and for the purposes specified.

In testimony whereof I have hereunto affixed my signature in the presence of two witnesses.

OSCAR H. PIEPER.

Witnesses:
C. H. CLEMENT,
CHAS. H. PIEPER.